United States Patent
Audren

(10) Patent No.: US 7,165,746 B2
(45) Date of Patent: Jan. 23, 2007

(54) VIBRATION MOTOR PRIMARY FLIGHT CONTROL ACTUATOR

(75) Inventor: Jean Thierry Audren, St Remy les Chevreuse (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/480,091

(22) PCT Filed: Jun. 7, 2002

(86) PCT No.: PCT/FR02/01960

§ 371 (c)(1),
(2), (4) Date: Jul. 19, 2004

(87) PCT Pub. No.: WO02/098735

PCT Pub. Date: Dec. 12, 2002

(65) Prior Publication Data

US 2004/0238688 A1    Dec. 2, 2004

(30) Foreign Application Priority Data

Jun. 7, 2001    (FR) ................................. 01 07436

(51) Int. Cl.
    *B64C 13/00*    (2006.01)

(52) U.S. Cl. .................................................. 244/75 R
(58) Field of Classification Search .............. 244/75 R, 244/75 A, 177, 178, 228, 74 R; 310/328, 310/330, 331, 323.02, 323.06, 12–31; 188/195
    See application file for complete search history.

(56) References Cited

U.S. PATENT DOCUMENTS 2,498,064 A * 2/1950 Borell ........................ 244/179

FOREIGN PATENT DOCUMENTS

| EP | 0921070 | 6/1999 |
| EP | 0980102 | 2/2000 |

OTHER PUBLICATIONS

"On active aeroelastic control of an adaptive wing using piezoelectric actuators", Rocha, Journal of Aircraft p. 278, Jan./Feb. 2005.*

(Continued)

*Primary Examiner*—Teri Pham Luu
*Assistant Examiner*—S. A. Holzen
(74) *Attorney, Agent, or Firm*—Blakely Sokoloff Taylor & Zafman

(57) ABSTRACT

The invention provides an actuator for a control surface (7), in particular for a primary flight control of an aircraft, the actuator including a main actuator (3) in a main control line (1) for actuating the control surface (7), the actuator being characterized in that the actuator of the main control line (1) comprises a motor of the vibration motor type, and in that it further comprises, in a compensation, secondary control line (2), a compensation actuator (4) and spring-forming apparatus (5) interposed between the compensation actuator (4) and the control surface (7), the compensation actuator (4) tensioning or compressing the spring-forming apparatus so as to make them suitable for delivering a mean force to the control surface (7) so as to off-load from the main actuator (3) the mean force that it needs to deliver to the flight control (7).

13 Claims, 4 Drawing Sheets

U.S. PATENT DOCUMENTS

| | | | | |
|---|---|---|---|---|
| 2,699,833 | A * | 1/1955 | Jensen | 416/33 |
| 3,021,097 | A * | 2/1962 | Hecht | 244/197 |
| 3,023,985 | A * | 3/1962 | Hong et al. | 244/178 |
| 4,236,426 | A * | 12/1980 | Meinke et al. | 192/30 R |
| 4,309,107 | A * | 1/1982 | McNair et al. | 356/476 |
| 4,426,607 | A * | 1/1984 | Black et al. | 318/628 |
| 4,600,863 | A * | 7/1986 | Chaplin et al. | 318/114 |
| 4,710,656 | A * | 12/1987 | Studer | 310/51 |
| 4,915,074 | A * | 4/1990 | Arai | 123/399 |
| 4,922,159 | A * | 5/1990 | Phillips et al. | 318/128 |
| 5,032,753 | A * | 7/1991 | Yamaguchi et al. | 310/317 |
| 5,394,044 | A * | 2/1995 | Yamamura | 310/90.5 |
| 5,403,017 | A * | 4/1995 | Doss et al. | 273/372 |
| 5,515,269 | A * | 5/1996 | Willis et al. | 705/29 |
| 5,620,068 | A * | 4/1997 | Garnjost et al. | 188/378 |
| 5,621,656 | A * | 4/1997 | Langley | 700/280 |
| 5,626,312 | A * | 5/1997 | Head | 244/99.8 |
| 5,769,362 | A * | 6/1998 | Greene et al. | 244/197 |
| 5,775,469 | A * | 7/1998 | Kang | 188/267 |
| 5,780,948 | A * | 7/1998 | Lee et al. | 310/81 |
| 5,907,211 | A * | 5/1999 | Hall et al. | 310/328 |
| 5,912,525 | A * | 6/1999 | Kobayashi et al. | 310/323.03 |
| 5,986,385 | A * | 11/1999 | Atsuta | 310/323.06 |
| 6,060,816 | A * | 5/2000 | Audren | 310/323.02 |
| 6,082,672 | A * | 7/2000 | Audren | 244/99.8 |
| 6,167,388 | A * | 12/2000 | Ray | 705/400 |
| 6,182,048 | B1 * | 1/2001 | Osborn et al. | 705/4 |
| 6,204,590 | B1 * | 3/2001 | Audren et al. | 310/316.01 |
| 6,231,013 | B1 * | 5/2001 | Jaenker | 244/215 |
| 6,268,682 | B1 * | 7/2001 | Audren | 310/333 |
| 6,295,006 | B1 * | 9/2001 | Kohlhepp | 340/946 |
| 6,322,324 | B1 * | 11/2001 | Kennedy et al. | 416/1 |
| 6,354,536 | B1 * | 3/2002 | Torok et al. | 244/39 |
| 6,453,669 | B1 * | 9/2002 | Kennedy et al. | 60/527 |
| 6,455,983 | B1 * | 9/2002 | Dettmann et al. | 310/328 |
| 6,459,190 | B1 * | 10/2002 | Johansson et al. | 310/323.16 |
| 6,552,470 | B1 * | 4/2003 | Hodar | 310/317 |
| 6,594,597 | B1 * | 7/2003 | Schoch | 702/81 |
| 6,648,599 | B1 * | 11/2003 | Preissler | 416/1 |
| 6,765,335 | B1 * | 7/2004 | Wischnewskiy | 310/323.02 |
| 6,847,935 | B1 * | 1/2005 | Solomon et al. | 705/14 |
| 6,938,408 | B1 * | 9/2005 | Lair | 60/226.2 |
| 6,983,833 | B1 * | 1/2006 | Ivers et al. | 188/379 |
| 2002/0113522 | A1 * | 8/2002 | Hodar | 310/314 |
| 2003/0034697 | A1 * | 2/2003 | Goldner et al. | 310/17 |
| 2003/0074294 | A1 * | 4/2003 | Merkin et al. | 705/36 |
| 2003/0189488 | A1 * | 10/2003 | Forcier et al. | 340/572.1 |
| 2003/0208494 | A1 * | 11/2003 | Francois Olivier | 707/100 |
| 2003/0225588 | A1 * | 12/2003 | Davidson et al. | 705/1 |
| 2004/0090195 | A1 * | 5/2004 | Motsenbocker | 318/109 |
| 2004/0148181 | A1 * | 7/2004 | McKnight et al. | 705/1 |
| 2004/0233568 | A1 * | 11/2004 | Rao et al. | 360/75 |
| 2004/0238688 | A1 * | 12/2004 | Audren | 244/75 R |
| 2005/0082950 | A1 * | 4/2005 | Zakoji | 310/348 |
| 2005/0185062 | A1 * | 8/2005 | Hillis et al. | 348/218.1 |

OTHER PUBLICATIONS

"Finite Elecment and experimental investigation of Piezoelectric actuated smart shells", V. K. Gupta, American Institute of Aeronautics and Astronautics, AIAA Journal, New York, Oct. 2004, vol. 42, Iss. 10; p. 2112.*

Distributed Piezoelectric element method for vibration control of smart plates, Dongchang Sun, American Institue of Aeronautics and Astronautics, AIAAA Journal, New Yourk: Nov. 1999, vol. 37, Iss. 11, p. 1459.*

Ryou, Jung-Kyu, Electrode pattern design of piezoelectric sensors and actuators using genetic algorithms, American Institute of Aeronautics and Astronautics, AIAA, Journal, New York; Feb. 1998. vol. 36; p. 227-234.*

Hao Hua Ning, Optimal number and placements of piezoelectric path actuators in structural active vibration control, School of Science, Xi'an Shi You University, Xi'an, People's Repuvblic of China, p. 651, Enigneering Compution 2004.*

"Des Commandes de vol piezo-electriques" Air and Cosmos, Aviation Magazine Int'l, Feb. 28, 1997, pp. 20-21.

"Actionneurs: Des materiaux piezo-electriques pour les commandes du futur", Usine Nouvelle Mensuel, Paris, Fr., Oct. 31, 1996, pp. 52-53.

* cited by examiner

VIBRATION MOTOR PRIMARY FLIGHT CONTROL ACTUATOR

The present patent application is a non-provisional application of International Application No. PCT FR02/01960, filed Jun. 7, 2002.

GENERAL FIELD OF THE INVENTION AND PRIOR ART

1. General Introduction

The present invention relates to aircraft actuators for primary flight control.

The power controls for the controlled surfaces of transport airplanes are usually hydraulically operated. Aircraft manufacturers are looking for solutions to replace that technology, firstly for reasons of health and safety (risk of fire associated with hydraulic liquid; toxicity of hydraulic liquid; chemical aggressivity of hydraulic liquids; pollution), and secondly for reasons of cost (reduced maintenance).

Nevertheless, the solutions proposed must lead neither to equipment that is heavier nor to equipment that consumes more energy since that would increase operating costs.

Piezoelectric motors form some of the solutions being considered by aircraft manufacturers for replacing hydraulic control.

2. Prior Art

Piezoelectric vibration motors as described in European patents EP 0 907 213, EP 0 980 102, and in French patent application FR 00/03084 enable mechanical powers of several kilowatts to be achieved, which is compatible with the power needed for controlling a control surface of a transport airplane.

Their advantages are that they present:

a large ratio of delivered power over mass;

low output speed associated with high torque; and very low rotor inertia.

The first advantage is important for the profitability of the airplane. Any reduction in the mass of the structure or the equipment of an airplane can be compensated by an increase in the payload that can be transported, other things remaining equal.

The second advantage makes it possible to limit or reduce to zero the number of complicated speed-reducing mechanisms. Such mechanisms are needed if conventional electric motors (electromagnetic motors) are used. At equivalent power, such motors deliver high speed and low torque. Limiting the number of speed-reducing mechanisms helps further improve the first advantage.

The third advantage enables the amount of kinetic energy that accumulates in a motor to be minimized. Consequently, energy consumption is minimized when a control surface is being controlled continuously to implement the small movements needed for stabilization and fine control of the airplane. The minimization of kinetic energy also comes from the small reduction ratio that forms part of the second advantage.

Drawbacks

Nevertheless, piezoelectric vibration motors present certain drawbacks compared with present hydraulic actuators or with the electromagnetic actuators that might be used:

they generally become blocked in the absence of an electricity power supply;

they have an operating lifetime of several thousands of hours when they are used at full power; it should be recalled that the working lifetime of an airplane is several tens of thousands of hours of flying time; and the length of time full power can continue to be delivered remains limited to a few minutes, given the associated heating.

SUMMARY OF THE INVENTION

An object of the invention is to mitigate those drawbacks, and in particular it proposes an actuator structure suitable for making use of piezoelectric vibration motors.

To this end, the invention provides an actuator for a control surface, in particular for a primary flight control of an aircraft, the actuator including a main actuator in a main control line for actuating the control surface, the actuator being characterized in that the actuator of the main control line comprises a motor of the vibration motor type, and in that it further comprises, in a compensation, secondary control line, a compensation actuator and spring-forming means interposed between the compensation actuator and the control surface, said compensation actuator tensioning or compressing the spring-forming means so as to make them suitable for delivering a mean force to the control surface so as to off-load from the main actuator the mean force that it needs to deliver to the flight control.

The invention is advantageously associated with the following characteristics taken singly or in any technically feasible combination:

the actuator of the compensation secondary line comprises a motor of the vibration motor type;

the compensation actuator tensions or compresses the spring-forming means when the main actuator is to supply a force having a non-zero mean value for a duration in excess of a threshold duration;

the threshold duration lies substantially in the range one second to twenty seconds;

the mechanical stiffness of the spring-forming means is selected in such a manner that the spring stroke needed for obtaining the maximum torque of the compensation actuator is considerably greater than the stroke of the control surface;

the position of the compensation actuator is blocked when it is exerting on the control surface the mean force suitable for off-loading the main actuator of the main force it needs to deliver to the control surface, the main actuator remaining in operational mode and then exerting on the control surface only the forces required for fine maneuvering and stabilization of the aircraft;

the main control line includes electrical clutch-forming means extending between the main actuator and the control surface, and enabling the control surface to be decoupled from the main actuator in the event of the main actuator malfunctioning;

the main line includes mechanical damper-forming means extending in parallel with the electrical clutch-forming means;

the control signals for positioning the control surface are determined by a flight control computer and they are transmitted to the main and compensation actuators via electronic control means;

the control signal for positioning the control surface is transmitted to the main actuator, and a feedback loop extending between the main control line and the secondary control line enables the compensation actuator to be controlled via lowpass filter-forming means extending in the secondary line and electronic control means interposed between the lowpass filter-forming means and the compensation actuator;

the feedback loop extends between firstly a force sensor interposed between the main actuator and the control surface, and secondly the lowpass filter-forming means;

the feedback loop extends between firstly a circuit for analyzing the control signals of the vibration motor, said control signals being representative of the torque delivered by the main actuator to the control surface, and secondly the lowpass filter-forming means, said analysis circuit extending from the electronic control means of the main control line; and the actuator includes means for detecting large-amplitude maneuvers of the control surface and then controlling means suitable for interrupting the feedback loop extending between the main control line and the secondary control line at the input to the transfer function and suitable for interrupting the secondary control line at the output from the transfer function.

DESCRIPTION OF THE INVENTION

The primary control surfaces are the main control surfaces for maneuvering an aircraft.

Control Angle

In flight, the primary control surfaces spend most of the time in a position close to a null position, corresponding to minimum aerodynamic drag. They are controlled to perform small movements at frequencies that may be as high as a few hertz (Hz) in order to perform fine stabilization of the airplane.

For particular maneuvers (banking to turn, moving the nose up or down to change altitude, take off, or land), the control surfaces are required to perform movements of large amplitude. The control surfaces are then operated for periods of time that are quite short: several seconds to several tens of seconds.

Small movements needed to stabilize the airplane are additional to such large movements for changing trajectory.

Torque

The control surface actuator must overcome opposing aerodynamic torque having two origins:

torque which is a function of the deflection angle of the control surface and which tends to return the control surface to its equilibrium position (aerodynamic return); and constant torque which depends on the speed of the airplane and which is the result of the moment of the lift forces about the hinge of the control surface. This torque can be positive or negative depending on the sign of the lift at the location where the control surface is to be found. By way of example, the control surface may lie in the main plane or in a fixed rear plane. This torque can even be zero when the control surface is a perfectly symmetrical rudder.

The maximum torque which the actuator is capable of delivering to overcome the aerodynamic torque of the control surface at an angular speed of zero is written $\Gamma_{max}$.

If the angular speed desired for moving the control surface with torque of $\Gamma_{max}/2$ is written $\omega_n$:

the angular speed desired for small movements is substantially equal to $\omega_n/2$; torque variation for such small movements is given by $\Gamma_{max}/10$;

the constant opposing torque to be overcome may have values lying in the range $\Gamma_{max}/5$ to $\Gamma_{max}/2.5$;

the mechanical power needed for a large displacement of a control surface is $P_{max}=\omega_n \times \Gamma_{max}/2$; and the mechanical power needed for small displacements of a control surface is not greater than $P_{max}=\omega_n/2 \times (\Gamma_{max}/10 + \Gamma_{max}/2.5)$. The portion $\Gamma_{max}/10$ corresponds to the torque delivered for small movements of the control surface, while the portion $\Gamma_{max}/2.5$ corresponds to the constant torque that needs to be supplied to maintain the mean position of the control surface. It will thus be understood that if the portion $\Gamma_{max}/2.5$ can be eliminated or reduced, then power dissipation is greatly reduced.

General Principle of the Invention

Figure 1:
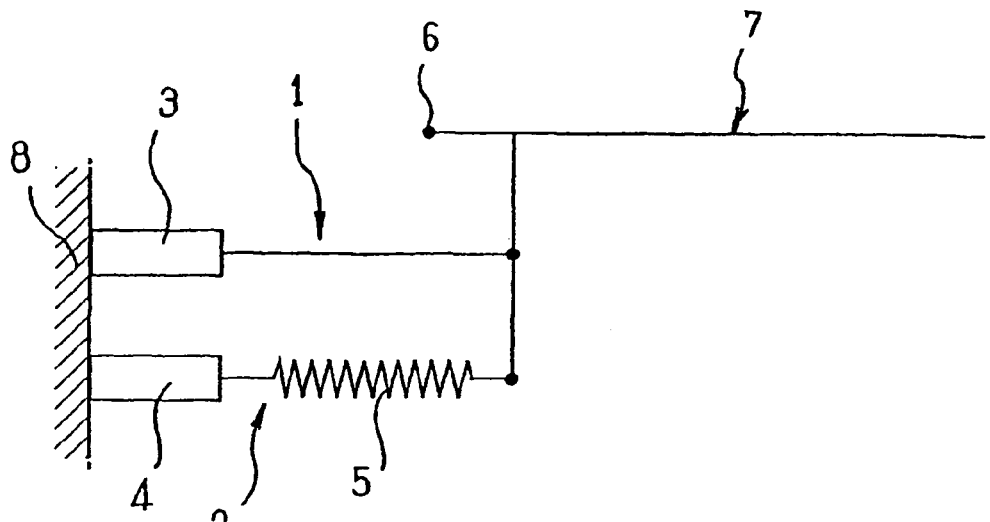
FIG. 1 shows a first embodiment of an actuator of the invention.

The architecture of the actuator of the invention is shown in FIG. 1.

Two actuation lines 1 and 2 are fixed to the structure 8 of the airplane. The line 1 is referred to as the "main" line, while the line 2 is referred to as the "secondary" line.

The main actuation line 1 and the secondary actuation line 2 include linear actuators 3 and 4. The actuator 3 is coupled directly to a control surface 7.

The actuator 3 is suitable for imparting all of the desired movements to the control surface 7.

The actuator 4 is coupled to the control surface 7 via spring-forming means 5. These means 5 are suitable for compensating the constant opposing torque of the control surface 7.

The linear movement of the actuators 3 and 4 is transformed into pivoting movement of the control surface 7 about its axis 6, as is often the case in airplanes. Nevertheless, it is possible to implement a device that is purely rotary or to provide a combination of both types of motion.

The device operates as follows:

When the aircraft is to perform a maneuver, the joystick controlled by the pilot or the on-board computers set a reference control signal for the main actuator 3.

If the force that needs to be maintained on the control surface does not have a zero mean value over a long period of time—e.g. more than 10 seconds—then the compensation actuator 4 is put into operation. This off-loads the force that needs to be supplied by the main actuator 3. For this purpose, the compensation actuator 4 loads the spring-forming means 5 until the expected force on the control surface 7 is obtained.

The mechanical stiffness of the spring-forming means 5 is selected so that the stroke of the spring needed for obtaining the maximum actuator torque 4 is much greater than the stroke of the control surface 7. With this condition satisfied, the return torque induced by the spring varies very little while the compensation actuator 4 is stopped. The main actuator 3 can thus provide the small movements of the control surface 7 and the fine adjustment required for piloting the airplane. The main actuator 3 no longer needs to deliver dynamic force having a high mean value. The compensation actuator 4 is in a blocked position, and uses the spring means 5 to supply the mean value of the force on the control surface 7. The compensation function is thus provided.

Figure 2:
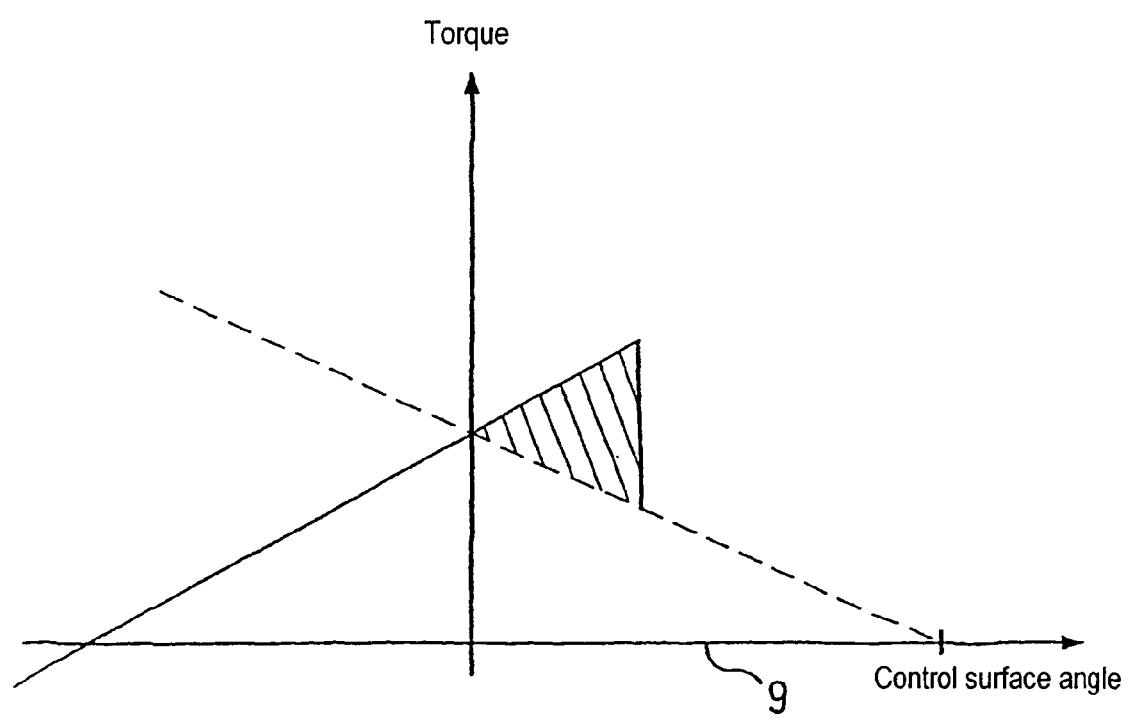
FIG. 2 shows how the torque delivered by the various actuators varies in order to oppose the torque due to aerodynamic drag.

FIG. 2 shows how the torques delivered by the main actuator 3 and by the compensation actuator 4 vary as a function of the angle of the controlled surface. The continuous line shows that the opposing torque from the control surface 7 increases with increasing angle thereof. This phenomenon is due to an increase in aerodynamic drag.

The dashed line shows that the torque exerted by the compensation actuator 4 decreases with increasing angle of the control surface. The distance 9 represents the stroke of the spring.

The shaded portion represents the torque that the main actuator must deliver in order to overcome the torque due to aerodynamic drag.

In addition, the opposing torque of the control surface varies with airplane flying conditions, and in particular with speed.

The piezoelectric motors are advantageously used in the actuators 4 and 5 forming part of a structure of the kind shown in FIG. 1:

the main actuator 4 delivers only small amounts of power, except when a large angle of deflection is required; its lifetime is thus considerably increased; and the compensation actuator 5 operates only while the flying conditions generated by the airplane are varying; so long as flying conditions remain steady, its power supply can be disconnected, with the motor then remaining blocked and holding the spring in the compressed or tensioned state.

Applying piezoelectric motors to the main actuator 3 is one of the main advantages of the invention. Aircraft stability and piloting requires small movements to be controlled at high frequency. The energy saving supplied by this low inertial piezoelectric mechanism is considerable.

A piezoelectric motor is also advantageously used in the compensation actuator 4. However it is possible to use a conventional electric motor followed by a considerable stepdown gear stage in the secondary line 2.

The gearbox can be irreversible so that the motor remains stationary when it is not powered. The control surface then remains in position in spite of the opposing torque from the control surface 7.

If this is not the case, the device can be associated with a brake.

DESCRIPTION OF ONE OR MORE VARIANT EMBODIMENTS OF THE INVENTION

General Structure of the Actuators

Although piezoelectric motors provide power at speeds that are lower than the speeds of conventional electric motors, their speed is often greater than that desired for the control surface 7. Speed reduction is needed, and it can be implemented in the form of rotary gearing, a rack-and-pinion configuration, or a screw if it is desired to implement linear motion.

First Variant: Declutching the Main Actuator

For safety reasons, the control surface must return to a neutral position in the event of the electrical power supply being interrupted.

An actuator using a piezoelectric motor remains blocked in the position it occupied at the time the electrical power supply was interrupted.

Figure 3:
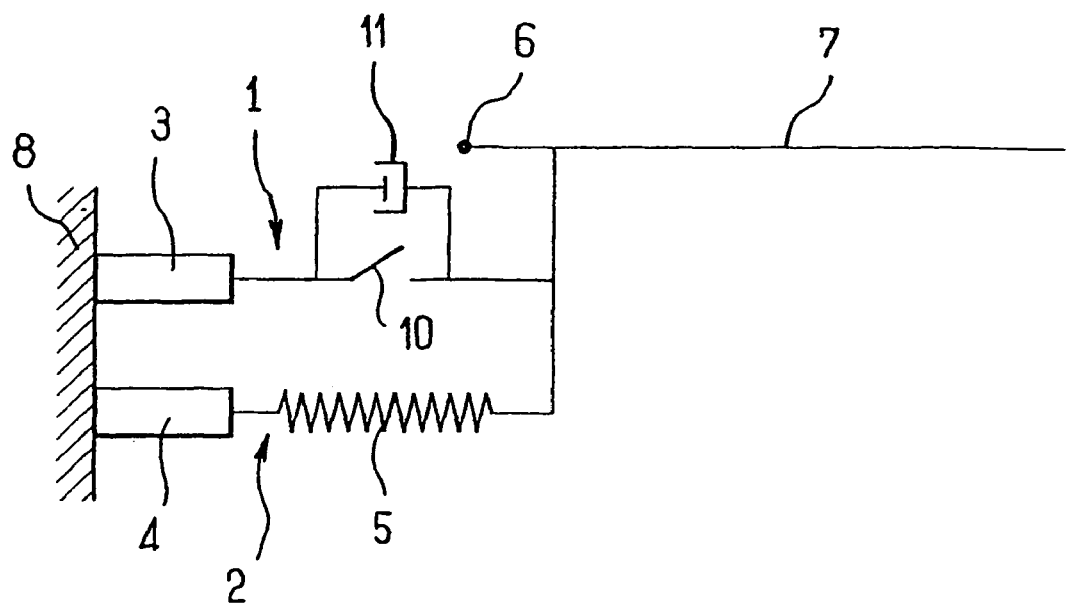
FIG. 3 shows another possible embodiment including a clutch and a damper in the main line.

FIG. 3 shows a device which includes an electrical clutch 10 in the drive line 1, serving to decouple the control surface 7 as soon as the power supply voltage to the actuator motor 3 disappears. This allows the control surface to return to the neutral position.

The means 10 are known to the person skilled in the art and are not described in detail below.

Second Variant: Damping the Main Actuator

When the movement of the control surface becomes free in this way, it is preferably damped. Damping can be performed using the clutch system. It is designed to present non-negligible residual friction in the declutched position.

A damper 11 may also extend between the inlet and the outlet of the clutch 10 as shown in FIG. 3.

One or both of the additional elements 10 and 11 may be linear or rotary. They may be located in any position in the drive line between the outlet of the motor and the control surface 7.

DESCRIPTION OF ONE OR MORE WAYS OF MANAGING THE CONTROLS OF TWO ACTUATORS

There are several methods of controlling this dual actuator, and without being exhaustive, mention can be made of the following:

open loop;

closed loop with a force sensor; and closed loop without a force sensor.

All of these kinds of control can be combined with the fact that one or the other or both of the actuators is or is not provided with angular or linear displacement sensors.

First Possible Implementation: Open-Loop Control

Figure 4:
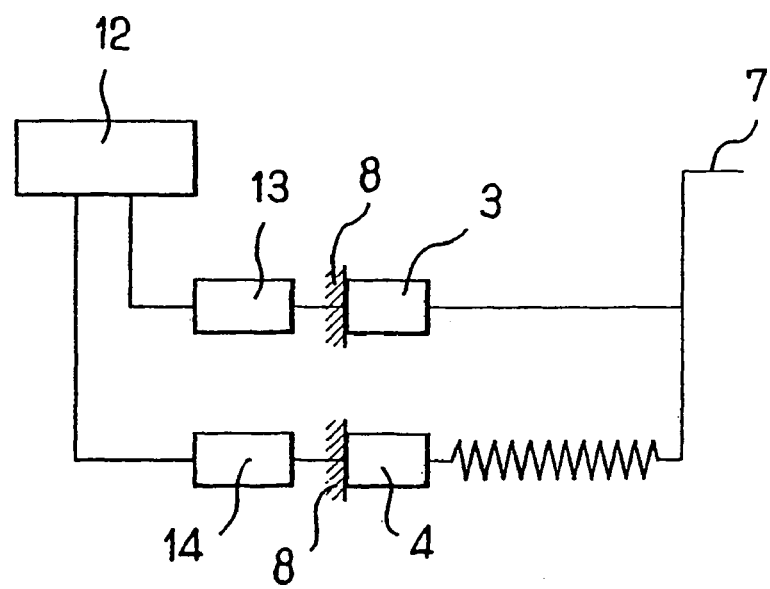
FIG. 4 shows an open-loop control configuration for an actuator of the invention.

FIG. 4 shows the structure of an actuator of the invention in which the actuators 3 and 4 are controlled in an open loop.

In this case, a computer 12 of the airplane itself determines the compensation it needs to apply as a function of general flying conditions which it can assess itself using sensors and/or all the other control signals it needs to apply to the actuators of the airplane.

Instructions from the airplane computer 12 are delivered to the control electronics 13 and 14 that correspond to the actuators 3 and 4 respectively.

First Variant: Closed-Loop Control with Force Sensor

Figure 5:
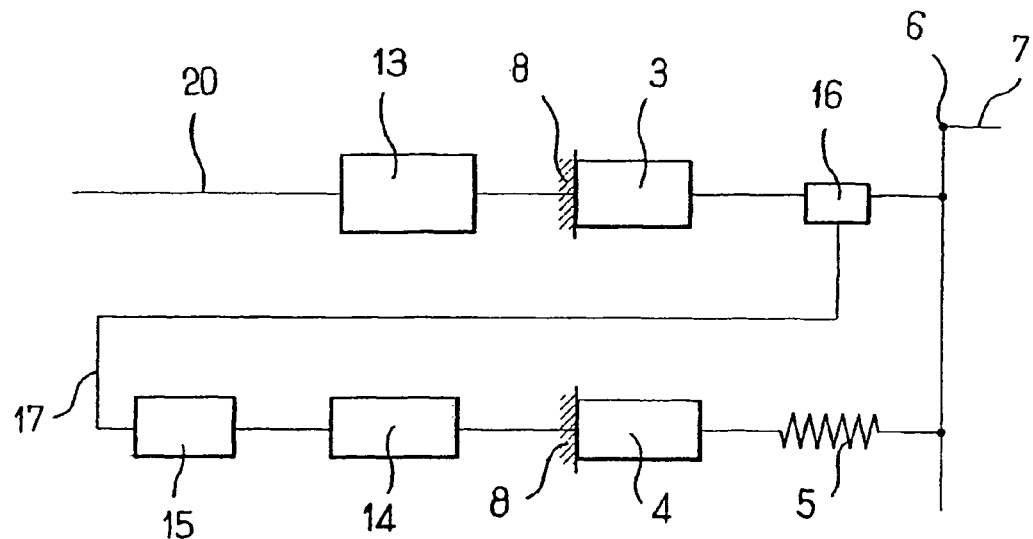
FIG. 5 shows a closed-loop control configuration for an actuator of the invention, with a force sensor.

In the structure shown in FIG. 5, a fourth sensor 16 measures the torque or the force applied by the main actuator 3. The signal 17 is processed by an electronic control unit 15 of optionally linear transfer function and of the lowpass type.

The output from the unit 15 is connected to control electronics 14. The electronic unit 15 includes means for controlling piezoelectric elements that may comprise analog and/or digital electronics where the digital electronics itself comprises a signal processor and software, a programmable circuit, or any other control means. These control means are suitable for operating the electronics 14 for controlling the compensation actuator 4 until the signal from the force sensor presents a mean value of zero.

Second Variant: Closed-Loop Control without Force Sensor

Figure 6:
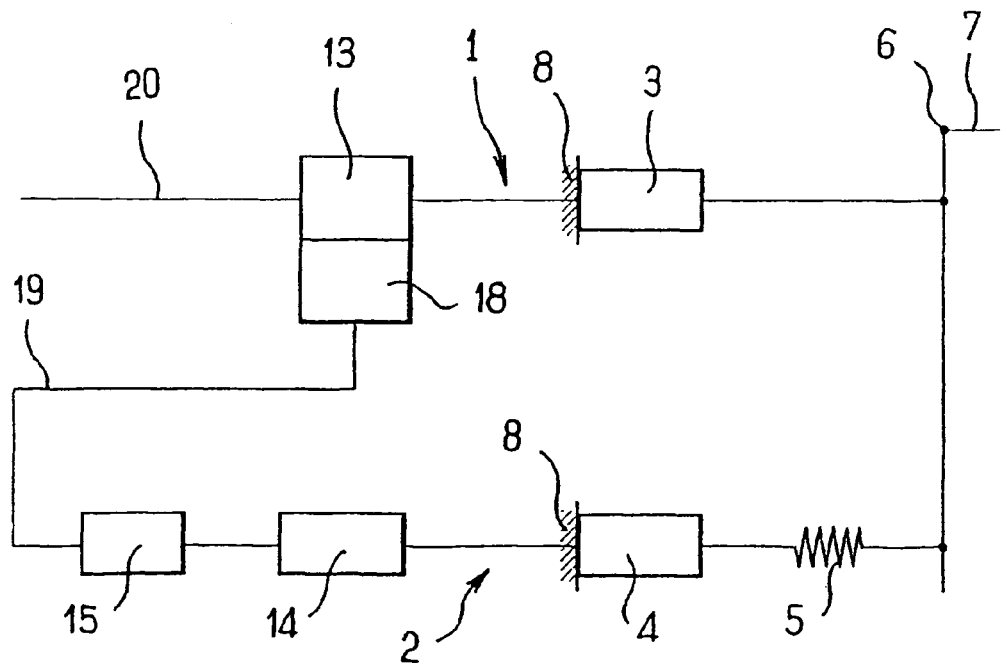
FIG. 6 shows a closed-loop control configuration for actuator of the invention without a force sensor.

In the structure shown in FIG. 6, electronics 13 for controlling the main actuator serves to evaluate the force being developed by the main actuator 3, in particular by monitoring the power consumption of its circuits. Circuit power consumption is monitored by a unit 18. The signal 19 output by the unit 18 is applied to a unit 15 of optionally linear transfer function and of the lowpass type.

In the above two examples using a closed loop, the control signal 20 delivered by the pilot system indicates the desired total control position. There is no need to split it into two parts using other information or processing. The closed loop enables the position of the actuator 4 to be adjusted so as to ensure that the amount of force applied by the actuator 3 to the control surface 7 is minimized.

The transfer function of the unit 15 is a correcting network. The cutoff frequency of the compensation loop 2 constituted in this way is selected to be low enough to filter out all of the small movements of the control surface. Nevertheless, it is selected to be high enough to be able to track general changes in the flying configuration of the airplane, and in particular its speed. A value of a few hundreds of a Hz seems suitable.

The effectiveness of the transfer function 15 can advantageously be increased by introducing thresholds. When the estimated mean torque applied by the main actuator 3 passes beneath such thresholds in absolute value, then no effort is made to find better compensation and control of the compensation actuator 4 is switched off. Because of the large stroke required of the compensation actuator 4 (low stiffness of the spring), seeking perfect compensation runs the risk of causing the compensation actuator 4 to consume more energy than that which might be saved in the main actuator 3 even if compensation were perfect.

Third Variant

Figure 7:
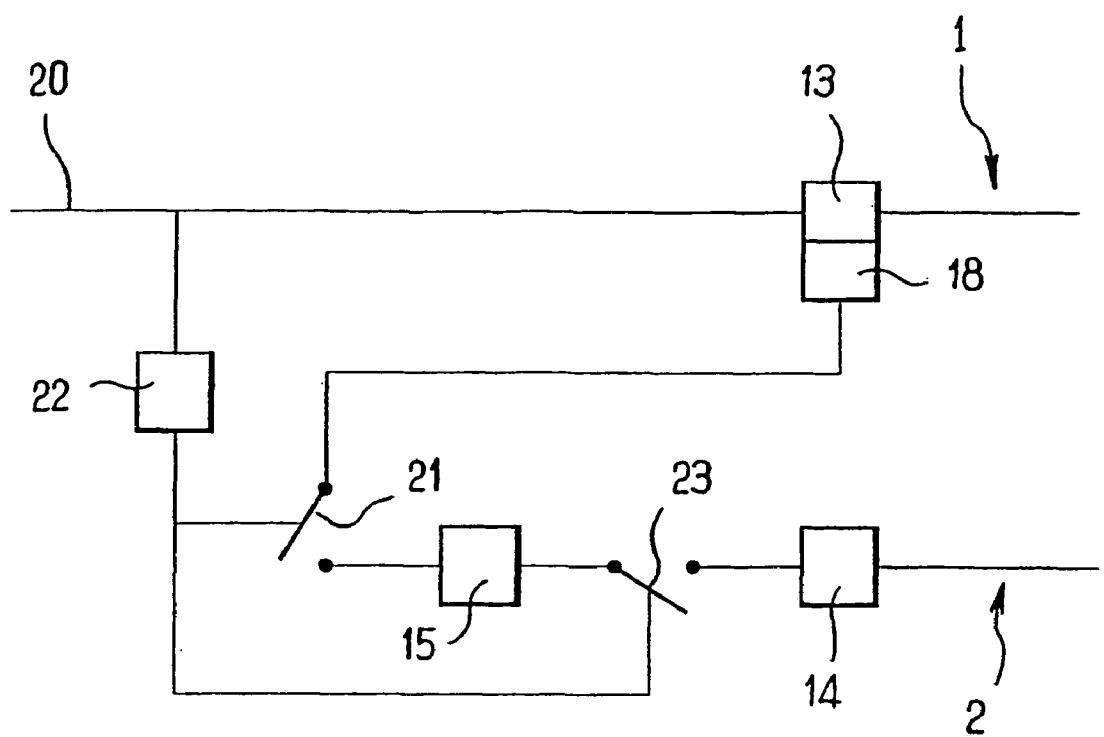
FIG. 7 shows a closed-loop control configuration for an actuator of the invention including a device for decoupling the closed loop.

As shown by the structure of FIG. 7, in order to avoid disturbing the estimation of the mean torque during large deflections of the control surface 7—as detected by the means 22—the operation of the transfer function 15 is interrupted both on input and on output by respective switches 21 and 23.

The invention is advantageously applied to actuators for aircraft control surfaces, however it also applies to any system in which loading comprises two portions: a practically constant portion corresponding to a mean position and a highly variable portion about this almost constant position corresponding to controlling small movements.

The invention claimed is:

1. An actuator for a control surface (7), for a primary flight control of an aircraft, the actuator including a main actuator (3) in a main control line (1) for actuating the control surface (7), wherein the actuator of the main control line (1) comprises a vibration motor, a secondary control line (2), a compensation actuator (4) and spring-forming means (5) disposed between the compensation actuator (4) and the control surface (7), said compensation actuator (4) tensioning or compressing the spring-forming means to deliver a mean force to the control surface (7) so as to off-load from the main actuator (3) the mean force delivered to the flight control (7).

2. An actuator according to claim 1, wherein the actuator (4) of the compensation secondary line (2) comprises a piezoelectric motor.

3. An actuator according to claim 1, wherein the compensation actuator (4) tensions or compresses the spring-forming means (5) when the main actuator supplies a force having a non-zero mean value for a duration in excess of a threshold duration.

4. An actuator according to claim 3, wherein the threshold duration lies substantially within the range 1–20 seconds.

5. An actuator according to claim 1, wherein the mechanical stiffness of the spring-forming means is selected so that the spring stroke needed for obtaining the maximum torque of the compensation actuator (4) is greater than the stroke of the control surface (7).

6. An actuator according to any preceding claim, wherein the position of the compensation actuator (4) is blocked when it is exerting on the control surface (7) the mean force for off-loading the main actuator of the main force needed to deliver to the control surface (7), the main actuator (3) remaining in operational mode and then exerting on the control surface (7) only the forces required for fine maneuvering and stabilization of the aircraft.

7. An actuator according to claim 1, wherein the main control line includes electrical clutch-forming means (10) extending between the main actuator and the control surface, for enabling the control surface (7) to be decoupled from the main actuator (3) in the event of the main actuator malfunctioning.

8. An actuator according to claim 7, wherein the main line includes mechanical damper-forming means (11) extending in parallel with the electrical clutch-forming means.

9. An actuator according to claim 1, wherein the control signals for positioning the control surface (7) are determined by a flight control computer (12) and are transmitted to the main and compensation actuators (3, 4) via electronic control means (13, 14).

10. An actuator according to claim 1, wherein the control signal for positioning the control surface (7) is transmitted to the main actuator (3), and a feedback loop (17, 19) extending between the main control line (1) and the secondary control line (2) enables the compensation actuator (4) to be controlled via lowpass filter-forming means (15) extending to the secondary line and electronic control means (14) interposed between the lowpass filter-forming means (15) and the compensation actuator (4).

11. An actuator according to claim 10, wherein the feedback loop (17, 19) extends between a force sensor (16) interposed between the main actuator (3) and the control surface (7), and the lowpass filter-forming means (15).

12. An actuator according to claim 10, wherein the feedback loop (17, 19) extends between a circuit (18) for analyzing the control signals of the vibration motor, said control signals being representative of the torque delivered by the main actuator to the control surface (7), and the lowpass filter-forming means (15), said analysis circuit extending from the electronic control means (13) of the main control line (1).

13. An actuator according to claim 10, further comprising means (22) for detecting large-amplitude maneuvers of the control surface (7) and controlling means (21, 23) for interrupting the feedback loop (17, 19) extending between the main control line (1) and the secondary control line (2) at the input to the transfer function (15) and for interrupting the secondary control line (2) at the output from the transfer function (15).

* * * * *